United States Patent [19]

Horaguchi et al.

[11] Patent Number: 4,919,905
[45] Date of Patent: Apr. 24, 1990

[54] PROCESS FOR THE SYSTEMATIC TREATMENT OF EXHAUST GASES

[75] Inventors: Mitsuhiro Horaguchi; Shigechika Tomizawa; Yuji Kaihara, all of Yokohama, Japan

[73] Assignee: Mitsubishi Jukogyo Kabushiki Kaisha, Tokyo, Japan

[21] Appl. No.: 230,700

[22] Filed: Aug. 9, 1988

Related U.S. Application Data

[63] Continuation of Ser. No. 913,476, Sep. 30, 1986, abandoned.

[30] Foreign Application Priority Data

Sep. 30, 1985 [JP] Japan .................. 60-214468

[51] Int. Cl.$^5$ ............ B01J 21/04; B01D 46/00; B01D 53/04
[52] U.S. Cl. .................. 423/239; 423/215.5; 423/235; 423/240; 423/244; 55/68; 55/71; 55/73
[58] Field of Search ............ 423/210, 210.5, 212, 423/235, 239, 213.2, 244, 240, 215.5, 351, 220, 213.7, 237; 502/407, 411, 412, 415; 55/68, 73

[56] References Cited

U.S. PATENT DOCUMENTS

| | | | |
|---|---|---|---|
| 3,429,656 | 2/1969 | Taylor et al. | 423/213 |
| 3,443,886 | 5/1969 | Taylor et al. | 423/213.7 |
| 3,895,094 | 7/1975 | Carter et al. | 423/212 |
| 4,093,422 | 6/1978 | Hain | 423/212 |
| 4,220,632 | 9/1980 | Pence et al. | 423/237 |
| 4,318,894 | 3/1982 | Hensel et al. | 423/213.2 |
| 4,426,365 | 1/1984 | Magder | 423/239 |
| 4,430,303 | 2/1984 | Linde | 423/239 |
| 4,469,662 | 9/1984 | Hamada et al. | 423/235 |
| 4,473,535 | 9/1984 | Kittrell et al. | 423/213.2 |
| 4,507,271 | 3/1985 | Van Deyck et al. | 423/239 |
| 4,609,537 | 9/1986 | Tolpin et al. | 55/73 |
| 4,609,539 | 9/1986 | Horecky et al. | 423/239 |
| 4,732,879 | 3/1988 | Kalinowski et al. | 423/215.5 |

FOREIGN PATENT DOCUMENTS

| | | | |
|---|---|---|---|
| 47242 | 5/1974 | Japan | 423/244 |
| 126425 | 10/1981 | Japan | 423/244 |

OTHER PUBLICATIONS

Haralt et al., "Removal of Sulfur and Nitrogen Oxides from Exhaust Gas", Chemical Abstract 94:126714v.

Primary Examiner—Anthony McFarlane

[57] ABSTRACT

A process for the systematic treatment of exhaust gases which comprises the steps of injecting a neutralizing absorbent and an auxiliary agent into the exhaust gas and passing the exhaust gas through a filter which has been precoated with the auxiliary agent, as used above, whereby the neutralizing absorbent and the auxiliary agent are permitted to deposit as a layer on the precoated filter and are able to collect the acidic gas components and dust in the exhaust gas and blowing ammonia into the emitted purified exhaust gas so that nitrogen oxides in the exhaust gas are reduced, in the presence of a denitrating catalyst, into nitrogen gas.

7 Claims, 1 Drawing Sheet

PROCESS FOR THE SYSTEMATIC TREATMENT OF EXHAUST GASES

This application is a continuation of application Ser. No. 06/913,476 filed on 9/30/80, now abandoned.

BACKGROUND OF THE INVENTION

1. Field of the Invention

The present invention relates to a process for the systematic treatment of exhaust gases from municipal refuse incineration plants or other incinerators so as to remove acidic gases and dusts from the exhaust gases.

2. Description of Related Art

As is well known in the art, exhaust gases from municipal refuse incineration plants or other incinerators generally contain acidic gases such as sulfur oxides, hydrogen chloride, nitrogen oxides and the like, and dusts. The treatment of these acidic gases and dusts at one time involves many problems.

The sulfur oxides and hydrogen chloride in the acidic gases can be relatively readily fixed with neutralizing absorbents such as lime, but the nitrogen oxides are not removed.

There is known a process of reducing nitrogen oxides into harmless nitrogen gas in the presence of a denitrating catalyst while introducing ammonia. In this connection, however, when sulfur oxides coexist, side reactions take place, making it difficult to cause the reduction reaction of the nitrogen oxides to selectively proceed. In addition, when dusts deposit on the catalyst, deterioration of the catalyst is inconveniently facilitated.

In order to carry out the removal of dusts, sulfur oxides and nitrogen oxides in separate apparatus, the cost of equipment and the operating cost become huge with a great economical burden.

SUMMARY OF THE INVENTION

It is an object of the present invention to provide a process for systematically treating an exhaust gas containing various types of acidic gases and dusts by one system as will otherwise be treated by rather than a plurality of different processes.

According to the present invention, there is provided a systematic treating process for exhaust gases which comprises the steps of; injecting a neutralizing absorbent into an exhaust gas to fix acidic gas components in the neutralizing absorbent; further injecting an auxiliary agent into the exhaust gas subsequent to the injection of the neutralizing absorbent and passing the exhaust gas through a filter which has been precoated with such an auxiliary agent as used above whereby the neutralizing absorbent and the auxiliary agent are permitted to deposit as a layer on the precoated filter and are able to collect acidic gas components remaining in the exhaust gas and a dust; and blowing ammonia into the purified exhaust gas so that nitrogen oxides in the exhaust gas are reduced in the presence of a denitrating catalyst into nitrogen gas.

The neutralizing absorbent used in the process of the present invention is an alkaline neutralizing absorbent which may be in the form of powder or a slurry, e.g. $Ca(OH)_2$, $CaCO_3$ or the like. The absorbent is preferably provided as a fine powder whose size is below 100 microns, preferably below 50 microns.

The auxiliary agent is precoated on the filter so that dusts are prevented from directly contacting the filter in order to protect the filter and also to facilitate separation of the deposition layer from the filter. In addition, the deposition layer formed along with the neutralizing absorbent is imparted with air permeability. The auxiliary agent should satisfy the requirements of (1) a small bulk density, (2) good air permeability, (3) non-stickiness when absorbing moisture, and (4) a particle size of from 1 to 100 microns, preferably from 10 to 50 microns. Examples of the auxiliary agent include zeolite, alumina, diatomaceous earth, perlite, activated clay, kaolin, feldspar and quartz in the form of powders. These materials may be used singly or in combination. Of these powders, zeolite, diatomaceous earth and perlite are preferred.

Our experiments reveal that the auxiliary powder is preferably added in an amount of not larger than 50 wt%, more preferably from 10 to 30 wt%, of the injected neutralizing agent.

The amount of the neutralizing agents such as powders of $Ca(OH)_2$ and $CaCO_3$ and a slurry of $Ca(OH)_2$ should be not less than an equivalent of reaction with acidic gases other than nitrogen oxides contained in the exhaust gas.

The denitrating catalyst is a denitrating catalyst for reduction including vanadium pentoxide or titanium oxide and may be used by deposition on porous ceramics.

DESCRIPTION OF THE PREFERRED EMBODIMENTS

Figure 1:
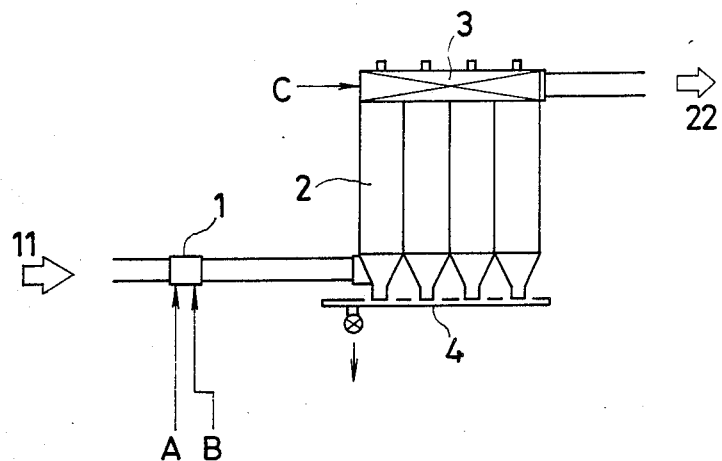
FIG. 1 is a schematic view for an apparatus of treating an exhaust gas for carrying out the process of the present invention.
Figure 2:
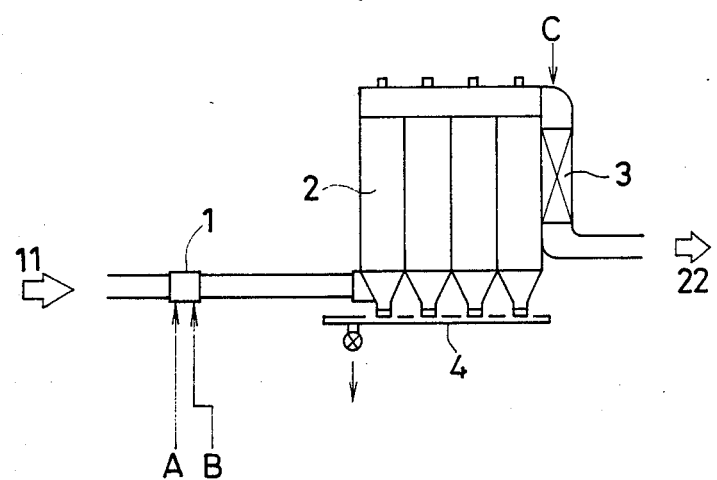
FIG. 2 is a schematic view showing another embodiment of the invention in which a denitrating device is changed in location.

In FIGS. 1 and 2, like reference numerals indicate like parts. In the figures, an exhaust gas 11 is passed along in the direction of the arrow through an exhaust gas pipe 1. During the passage, a neutralizing absorbent A and an auxiliary agent B are supplied by injection and mixed in the pipe 1, so that sulfur oxides and hydrogen chloride in the exhaust gas are fixed with the neutralizing absorbent A.

The exhaust gas is subsequently passed into a filter-type dust collector 2. The filter in the dust collector has been previously treated with an auxiliary agent to form a protective layer on the filter surface, e.g. a bag filter surface. The neutralizing absorbent A, the auxiliary agent B and dusts present in the exhaust gas are caught with the protective layer and the filter to form a deposition layer. On passage of the exhaust gas through the deposition layer, sulfur oxides and hydrogen chloride remaining in the exhaust gas are finally collected with the unreacted neutralizing absorbent in the deposition layer.

The exhaust gas from which the sulfur oxides, hydrogen chloride and dusts have been removed is passed into a nitrogen oxide eliminator 3 into which a reducing agent C such as ammonia is introduced. As a result, nitrogen oxides in the exhaust gas are reduced. The completely purified exhaust gas 22 is released as shown by arrow 22. In FIG. 2, the nitrogen oxide eliminator (denitrating device) is changed in location to the side of the filter-type dust collector.

The deposition layer on the filter of the dust collector 2 is able to keep air permeability with the aid of the auxiliary agent dispersed in the layer, but after a certain period of time, the grown deposition layer is separated and discharged from a discharge device 4 located at the bottom of the dust collector 2.

The present invention is more particularly described by way of example.

EXAMPLE

An exhaust gas from a municipal refuse incinerator was treated under the following conditions according to the following manner of treatment.

Treating conditions:

| | |
|---|---|
| Amount of incineration: | 150 tons/day |
| Amount of exhaust gas: | 30,000 Nm$^3$/hour |
| Concentration of SOx: | 100 ppm |
| Concentration of HCl: | 1,000 ppm |
| Concentration of NOx: | 150 ppm |

Manner of treatment

The apparatus of FIG. 1 was used and slaked lime was blown as neutralizing absorbent A at a rate of 100 kg/hour. The residence time for the gas was 5 seconds. A mixture of diatomaceous earth and perlite at a mixing ratio by weight of 9:1 was blown as auxiliary agent B at a rate of 10 kg/hour. The filter surface of the dust collector was uniformly precoated with the auxiliary agent B.

Results

The exhaust gas at the outlet of the treating apparatus had a concentration of sulfur oxides not larger than 10 ppm, a concentration of hydrogen chloride not larger than 20 ppm, and a concentration of nitrogen oxides not larger than 20 ppm. The filter and the denitrating catalyst were not found to deteriorate and were recognized as being capable of long use.

What is claimed is:

1. A systematic process for purifying and treating exhaust gases containing acidic gases and dust which comprises the steps of providing a filtering dust collector inclusive of a bag filter pre-coated with an auxiliary agent which forms a protective coating on said filter;

injecting a neutralizing absorbent into an exhaust gas containing acidic gas components and dust so as to fix said acidic gas components therein;

further injecting an auxiliary agent of the nature of said coated auxiliary agent into said exhaust gas subsequent to the injection of said neutralizing absorbent;

passing said exhaust gas containing said neutralizing absorbent and said auxiliary agent, through said precoated dust collector filter such that said neutralizing absorbent and auxiliary agent are deposited as a layer on said precoated filter whereby said fixed acidic gas components and dust, which are present in said exhaust gas, are collected on said filter as said exhaust gas is passed through and emitted from said filter; and blowing ammonia into said filtered emission gas in the presence of a denitrating catalyst so that residual nitrogen oxides present in said filtered emission gas are reduced to nitrogen gas to produce a purified gas.

2. The process according to claim 1, wherein said neutralizing absorbent is a powder or slurry selected from the group consisting of Ca(OH)$_2$, CaCO$_3$ and mixtures thereof.

3. The process according to claim 1, wherein said acidic gas components include sulfur oxide and hydrogen chloride.

4. The process according to claim 1, wherein said neutralizing absorbent is a fine powder having a particle size of less than 50 microns.

5. The process according to claim 1, wherein said auxiliary agent is added in an amount of from 10 to 30 weight percent of said injected neutralizing agent.

6. The process according to claim 1, wherein said denitrating catalyst is vanadium pentaoxide or titanium oxide deposited on a porous ceramic.

7. The process according to claim 1, wherein said auxiliary agent is at least one member selected from the group consisting of zeolite, alumina, diatomaceous earth, perlite, activated clay, kaolin, feldspar, quartz and mixtures thereof in the form of powder having a particle size of 10 to 50 μm, which properties are effective in facilitating separation of said acidic gas components and dust from said precoated filter.

* * * * *